Figure 1:
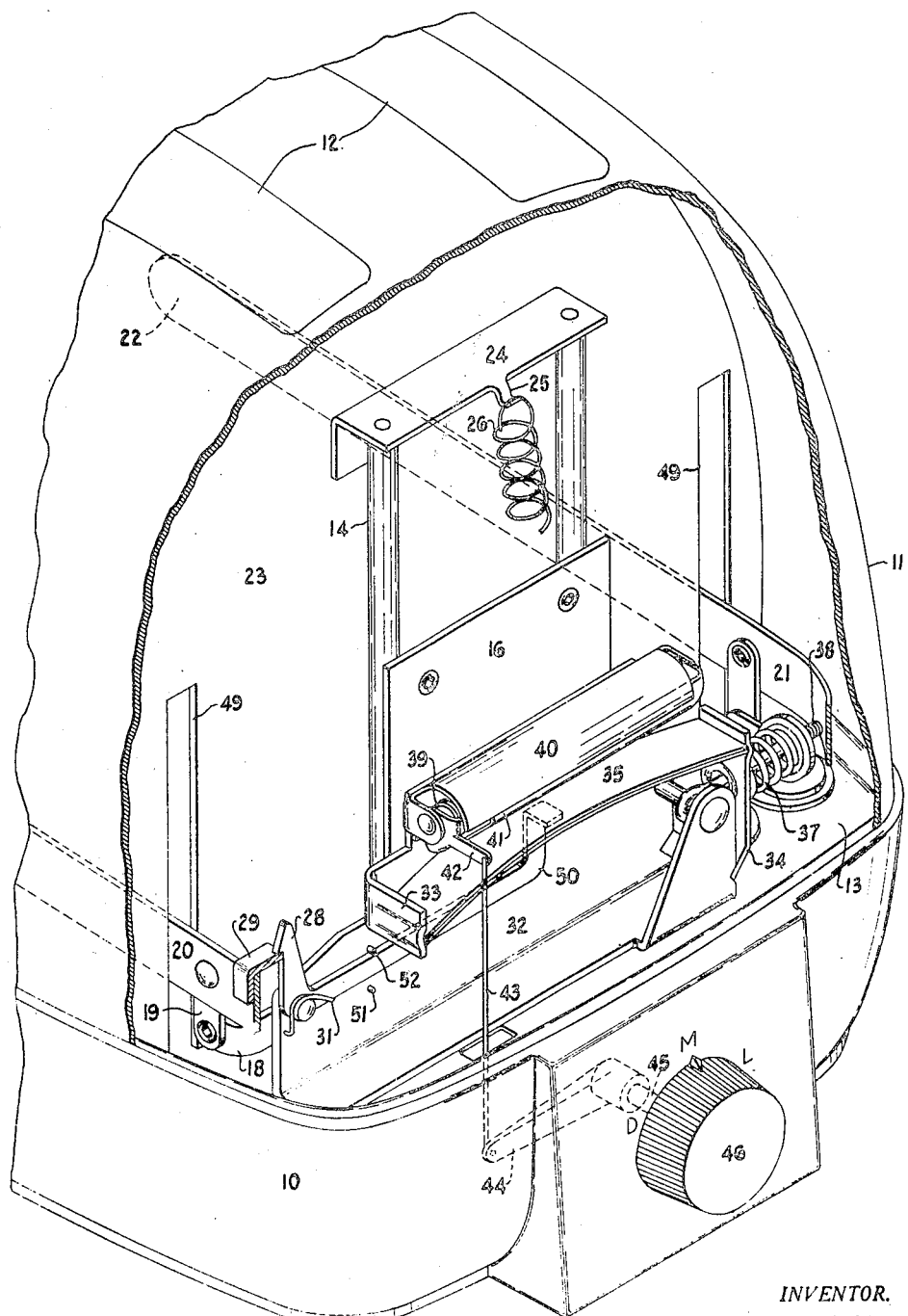

Nov 1, 1949.    H. B. WHITE    2,486,621
THERMAL TIMER

Filed Dec. 31, 1946    2 Sheets-Sheet 1

INVENTOR.
Harry B. White
BY
Harry S. Ducasse
ATTORNEY.

Patented Nov. 1, 1949

2,486,621

UNITED STATES PATENT OFFICE 2,486,621

THERMAL TIMER

Harry B. White, Canton, Ohio, assignor to The Hoover Company, North Canton, Ohio, a corporation of Ohio Application December 31, 1946, Serial No. 719,499

3 Claims. (Cl. 161—1)

1

The present invention relates to electric bread toasters and more particularly to a thermal timing mechanism for timing the duration of the toasting period whereby the operator may obtain toast cooked exactly as he or she desires.

In the past it has been the usual practice to time the toasting operation by a clockwork mechanism. Clock timers have the defect that the toasting time is fixed and accordingly the bread is progressively toasted more and more for each succeeding toasting operation because the toaster itself is hotter for each succeeding toasting operation especially when the succeeding operations follow each other in rapid succession.

An attempt has been made to overcome this difficulty by providing a compensating thermostat to speed up the operation of the clockwork mechanism for each succeeding toasting operation.

Such timers have been unsatisfactory because of their complexity and of their unreliableness in operation.

As a result thermal timers have been developed. Thermal timers inherently are self-compensating in that the timer as a whole also becomes progressively hotter for each succeeding toasting operation and accordingly shortens the toasting period for each succeeding operation.

It has been found, however, that thermal timers have a tendency to over-compensate. That is, for each succeeding toasting operation, the toast is cooked progressively less and less for any particular timer setting.

This result comes about by reason of the fact that heat is stored in the parts of the thermal timer from the preceding toasting operation and as a consequence the timer becomes hotter and hotter at the start of each succeeding toasting operation. This causes the thermally responsive element of the timer to act faster and faster for each succeeding toasting operation.

It is known in prior devices to heat a bimetal timing element by an auxiliary heater energized simultaneously with the main heaters and to direct the heat from the auxiliary heater to the bimetal timer by means of a reflector.

According to this invention, heat is directed from an auxiliary heater to a bimetal timer by means of a reflector and the amount of heat so directed is varied by a shield which is movable to and from a position between the heater and the bimetal so as to control the amount of heat directed to the bimetal and thus control the toasting period for light, medium and dark toast.

2

In prior bimetal timers, a spring has been provided with a factory adjustment for pre-stressing a bimetallic element so as to adjust it for proper operating conditions. In such prior devices, this spring has been a tension spring with the result that as the toaster and timer become progressively heated, the spring elongates and throws the bimetal timer out of adjustment or renders it entirely inoperative.

According to the present invention the factory adjustment is applied to a compression spring so related to the bimetal timer that as the toaster and timer progressively heat up the expansion of the spring will inherently compensate for the rise in temperature of the timer as a whole and lengthen the timing period for each succeeding toasting operation to reduce the over-compensating characteristics of thermal timers.

Figure 2:
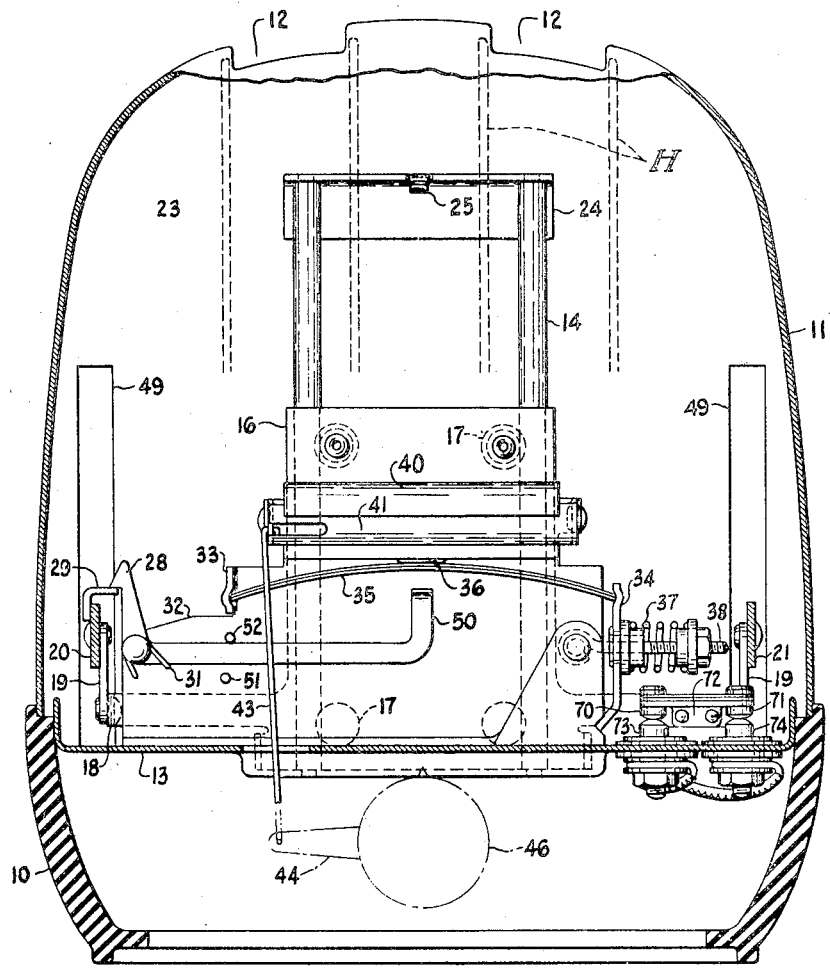

Further objects and advantages of this invention will become apparent as the description proceeds when taken in connection with the accompanying drawings, in which:

Figure 1 is a perspective view of a toaster with the timing mechanism of this invention applied thereto with the parts broken away to better show the details of the timing mechanism; and Figure 2 is a cross-sectional view of a toaster showing a front plan view of the timing mechanism of this invention.

Referring to the drawings, the toaster is provided with a plastic base 10 with a cover or appearance housing 11 mounted thereon to cover the mechanism and toasting compartments. The appearance housing 11 is provided with two toast receiving openings 12 as clearly shown in Figures 1 and 2.

A plate 13 (Fig. 2) is mounted on the base 10 and forms the support for the entire mechanism within the appearance housing 11.

Rigidly secured to a depressed portion of the supporting plate 13 are a pair of vertically extending parallel posts 14 which form guides for the toast carriers (not shown) lying immediately below the toast receiving openings 12.

The toast carriers are movable from an upper bread receiving position, in which toast resting on the carriers will project slightly through the openings 12, to a lower toasting position, between spaced heaters as is well known in the art.

Rigid with the toast carriers is an upwardly extending plate 16 which forms a support for four guide rollers 17 (Fig. 2) which cooperate with the posts 14 to guide the toast carriers as they are moved from the upper bread receiving position to the lower toasting position.

Mounted on the plate 16 and extending rearwardly therefrom are a pair of lugs 18. Pivoted to these lugs 18 are a pair of links 19, which at their upper ends are pivoted to the arms 20 and 21 of a U-shaped operating lever, which in turn is pivoted to the walls of the toast chamber as at 22 (Fig. 1). A handle (not shown) is attached to the front of the lever for manual operation thereof. The links 19 permit the carriers to move in a straight line vertical direction while the front of the lever is moving the arc of a circle about pivot points 22.

Extending upwardly from the supporting plate 13 is a partition 23 which separates the toasting chambers from the mechanism compartment. Attached to the partition 23 is an L-shaped bracket 24 which anchors the upper ends of the guide posts 14 and at its forward edge is provided with a hook 25 which forms the upper anchorage for a tension spring 26 (Fig. 1) secured at its lower end to a hook on the lever arms 20 and 21.

In operation the operator inserts bread through the receiving openings 12, grasps the handle and moves the lever arms 20 and 21 together with the toast carriers to toasting position against the tension of the spring 26.

When the lever is moved to toasting position it is latched in that position by the latch 28 which cooperates with a ledge 29 extending from the lever 20.

The latch 28 is pivotally mounted on a bracket 32 extending upwardly from the supporting plate 13 and is spring biased by the spring 31 into latching position.

Slots 49 are provided in the front plate 23 in which the two arms 20 and 21 of the lever reciprocate as the arms are moved upwardly and downwardly.

The bracket 32 is rigidly secured to the supporting plate 13 and supports the timing mechanism. The bracket 32 carries an inturned portion 33 and a pivotally mounted follower 34 which supports the opposite ends of a bimetal timer 35 so constructed that when it is cold it moves in an upward direction to an upper stable bowed position against a stop 36 and when hot moves in a downward direction to a lower stable bowed position.

The latch lever 28 is extended to a point beneath the bimetal 35 and is provided with an actuating arm 50. Stops 51 and 52 are provided for limiting movement of lever 28.

A factory adjustment for the bimetal timer 35 comprises the pivotally mounted follower 34, supporting one end of the bimetal timer 35, a compression spring 37 and an adjusting screw 38 extending through the follower 34 and pivoted to the bracket 32 as shown. In moving from its upper stable bowed position to its lower stable bowed position and vice versa, the bimetal 35 moves through an unstable position and is snapped to its opposite stable position by the spring 37.

An auxiliary heater 39, in the form of a wire spirally wound on a ceramic core, is positioned immediately above the bimetal timer 35 and a curved reflector 40 is positioned above the heater 39 to reflect heat therefrom to the bimetal timer 35.

In order to control the amount of heat transmitted from the heater 39 to the bimetal 35, a curved shield 41 is rotatably mounted inside the reflector 40. The shield 41 is so mounted as to be moved to a position entirely within the reflector 40 so that all of the heat from the heater 39 may be reflected to the bimetal timer 35 or to a position more or less between the heater 39 and the bimetal 35 so as to cut off radiation of the heat from the heater 39 to the bimetal 35. The inner surface of the shield 41 is also made reflecting so as to act as a substitute for the reflector 40 when it is moved to a position within the reflector.

In order to manually control the operation of the shield 41, a lug 42 extends from the shield 41 beyond its pivot point. The lug 42 is connected by a link 43 to an arm 44 (Fig. 1) extending from a shaft 45 rotatably mounted on the base 10 and extending to the outside thereof. A knob 46 is mounted on the shaft 45 exteriorly of the base 10 making it possible to manually adjust the timer to prepare light, medium or dark toast as desired. The indicia, D, L, M, (Fig. 1) indicates the control positions for dark, light, and medium toast respectively.

As previously stated, the bimetal timer 35 is constructed to move to a downwardly bowed position when hot and to an upwardly bowed position when cool. As the bimetal timer 35 is heated from its cold position, it moves slowly downwardly until it reaches its midpoint of movement when a condition of unstability occurs and it snaps rapidly to downwardly bowed position due to the compressive stress of the spring 37.

As the bimetal timer 35 snaps to its downwardly bowed position, it contacts the end 50 (Fig. 1) of the latch 28 and releases the toast carriers for upward movement under the tension of the spring 26.

The electric switch for controlling the operation of the main heaters H and the auxiliary heater 39 comprises two contacts 70, 71 mounted on arm 72. The contacts 70, 71 cooperate with fixed contacts 73 and 74 mounted on base plate 13 to energize the heaters H and 39 when the plate 16 is moved to downward position.

*Operation.*—With the handles 20 and 21 in upward position and the bread carriers in their toast receiving position, the operator adjusts for light, medium or dark toast as desired by rotating the adjusting knob 46 to the proper position and inserts bread slices through the openings 12 so that the slices rest on the bread carriers and project slightly above the appearance housing 11.

The operator then moves the handles 20 and 21 to downward position as shown in Fig. 1 against the tension of the spring 26 causing the latch 28 to snap over the ledge 29 and latch the bread carriers in their toasting position to energize the heaters H and 39.

A portion of the heat generated by the auxiliary heater 39 will be radiated directly to the bimetal timer 35. Another portion will be reflected to the bimetal timer 35 by means of the reflector 40. Preferably the bimetal timer 35 has its surfaces blackened so as to absorb heat more rapidly upon heating and to radiate it more rapidly in cooling.

If at this time the toaster has been set for dark toast as in Fig. 4, the shield 41 will prevent a major portion of the heat rays from the auxiliary heater 39 from being projected to the bimetal timer 35. If the toaster is set for medium toast, the shield 41 will be positioned upwardly somewhat from the position shown in Fig. 4 so that a greater portion of the heat from the auxiliary heater 39 will be transmitted to the bimetal timer 35. If the toaster is set for light toast the shield will be moved to a position within the reflector 40 so that practically all of the heat from the auxiliary heater 39 will be transmitted to the bimetal timer 35.

The auxiliary heater 39 having been energized simultaneously with the main heaters H, the bimetal timer 35 will become progressively hotter as the bread is toasted. As the bimetal timer 35 is heated it slowly moves in a downward direction compressing the spring 37 until it reaches dead center position when it snaps to its downwardly bowed position under the influence of the spring 37. In moving to its downward bowed position the bimetal timer 35 contacts the end 50 of the latch lever 28 to release the latch.

The bread carriers and their associated parts are then moved upwardly to non-toasting position under the influence of the spring 26.

If desired, suitable buffer springs or a dash pot mechanism may be provided to take up the shock as the bread carriers and their associated parts are moved to upward position.

Also, if desired, a manually operable lever having a portion extending outside the appearance housing 11 may be provided for releasing the latch 28 for manual inspection of the toast at any time during the toasting period.

The other parts of the timer such as the auxiliary heater 39, reflector 40, shield 41, etc. will have heat stored therein and become progressively hotter. This will cause the timer to have a tendency to over-compensate when the toaster is operated in rapid succession.

However, the compression spring 37 aids in this regard. As the toaster as a whole heats up the spring 37 becomes elongated and applies more pressure to the end of the bimetal 35 so that a greater temperature difference is required to snap it to its downward hot position. This will automatically compensate for the tendency of the thermal timer to over-compensate.

In prior thermal timers where a tension spring has been used, the progressive heating up of the toaster and timer causes less and less pressure to be applied to the ends of the bimetal as the tension spring becomes expanded and the timer eventually fails to function properly.

While I have shown and described but a single modification of my invention, it is to be understood that this modification is to be taken as illustrative only and not in a limiting sense. I do not wish to be limited to the particular structure shown and described, but to include all equivalent variations thereof except as limited by the scope of the claims.

I claim:
1. A thermal timer comprising, a bimetallic strip supported at its ends so as to move from a first bowed stable position from one side of its ends to a second bowed stable position on the opposite side of its ends as it is heated and cooled, a curved reflector lying in spaced parallel relation to said strip, a heater for said strip lying between said reflector and strip and a curved shield movable from a first position between said heater and strip to a second position lying within said reflector.

2. A thermal timer comprising, a bimetallic strip supported at its ends so as to move from a first bowed stable position on one side of its ends to a second bowed stable position on the opposite side of its ends as it is heated and cooled, a curved reflector lying in spaced parallel relationship to said strip, a heater for said strip lying between said reflector and strip, a curved shield movable from a first position between said heater and strip to a second position lying within said reflector and manual means for moving said shield from its first to its second position or to any intermediate position.

3. A self compensating thermal timer comprising a bimetallic strip; supports at opposite ends of said strip; one of said supports including a follower engaging the end of said strip, a compression spring having one end acting on said follower and adjustable means for applying a force to the opposite end of said spring to provide a factory adjustment; said strip and supports being so constructed and arranged that the strip will snap from a first stable bowed position on one side of said supports to a second bowed stable position on the opposite side of said supports as it is heated and back to its first stable position when it is cooled; a reflector lying in spaced parallel relation to said strip; a heater for said strip lying between said strip and reflector and a shield movable from a position lying between said heater and reflector to a position lying between said heater and strip.

HARRY B. WHITE.

REFERENCES CITED

The following references are of record in the file of this patent:

UNITED STATES PATENTS

| Number | Name | Date |
| --- | --- | --- |
| 2,197,221 | Koci | Apr. 16, 1940 |
| 2,237,146 | Ireland | Apr. 1, 1941 |
| 2,250,979 | Winborne | July 29, 1941 |
| 2,271,485 | Koci | Jan. 27, 1942 |